United States Patent
Fernandez-Martinez

(10) Patent No.: US 6,314,184 B1
(45) Date of Patent: Nov. 6, 2001

(54) BRACELET TELEPHONE DEVICE

(76) Inventor: Jose Ignacio Fernandez-Martinez, Perez Medina, 27, Alicante (ES), 03007

(*) Notice: Subject to any disclaimer, the term of this patent is extended or adjusted under 35 U.S.C. 154(b) by 0 days.

(21) Appl. No.: 09/445,611

(22) PCT Filed: Jun. 8, 1998

(86) PCT No.: PCT/ES98/00163
  § 371 Date: Dec. 8, 1999
  § 102(e) Date: Dec. 8, 1999

(87) PCT Pub. No.: WO98/57477
  PCT Pub. Date: Dec. 17, 1998

(30) Foreign Application Priority Data

Jun. 11, 1997 (ES) .................................................. 9701634 U

(51) Int. Cl.⁷ .................................................. H04M 1/00
(52) U.S. Cl. ..................................................... 379/433.1
(58) Field of Search ........................... 379/43.01, 433.1; 455/575, 90; 368/10

(56) References Cited

U.S. PATENT DOCUMENTS 5,008,864 * 4/1991 Yoshitake ............................... 368/10
5,659,611 * 8/1997 Saksa ..................................... 379/433
6,035,035 * 3/2000 Firooz .................................... 379/433

FOREIGN PATENT DOCUMENTS

WO 97/02513 * 1/1997 (WO) ................................... 379/433

* cited by examiner

Primary Examiner—Jack Chiang
(74) Attorney, Agent, or Firm—Adams, Schwartz & Evans, P.A.

(57) ABSTRACT

The device (1) comprises a mobile telephone apparatus/wireless telephone terminal (2) mounted in a fixed or removable way to a bracelet support (3) having a portion (5) wherein are housed electric supply batteries for supplying power to the device (1). The telephone apparatus (2) has a front panel (2a) with keyboard, presentation display and microphone (4), the apparatus (2) having preferably its larger dimension (T) oriented obliquely with respect to the longitudinal direction (P) of the bracelet (3). A ring-shape part (8) intended to be coupled to one finger of the user hand is removable with respect to the apparatus and supports an earphone (9) for the said apparatus (2) to which it is connected by an extensible electric cable (10) or by radio.

1 Claim, 2 Drawing Sheets

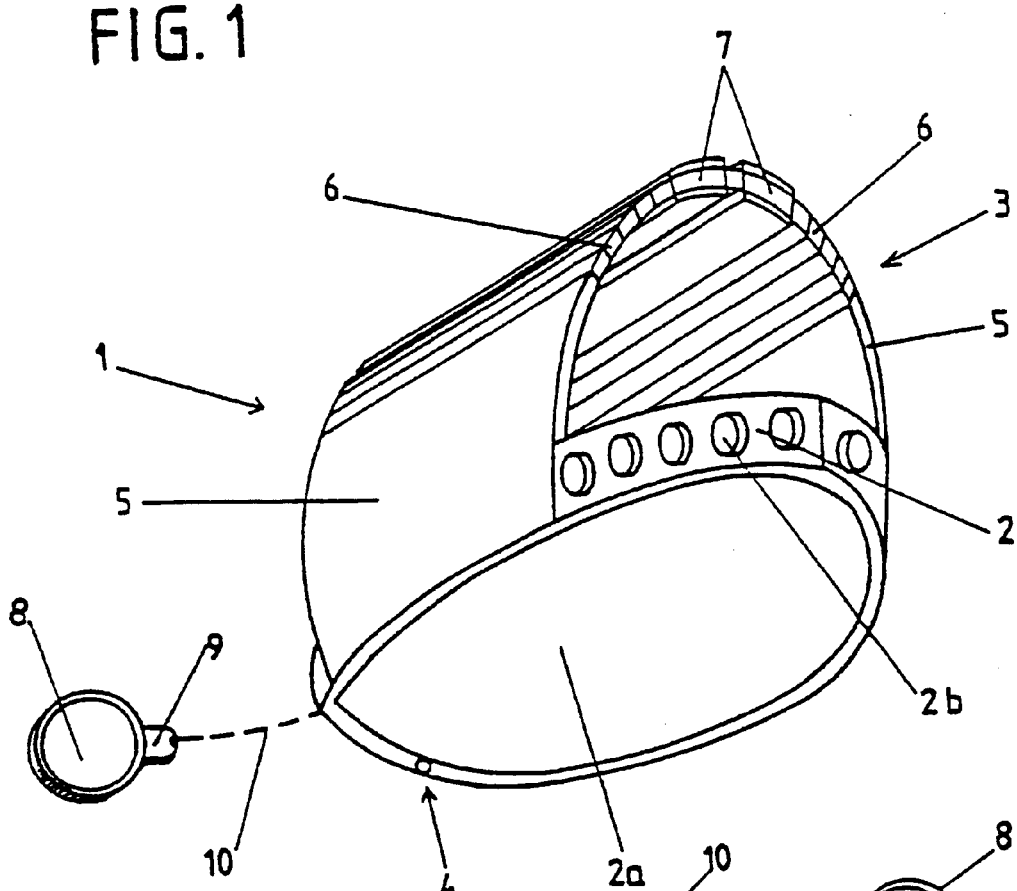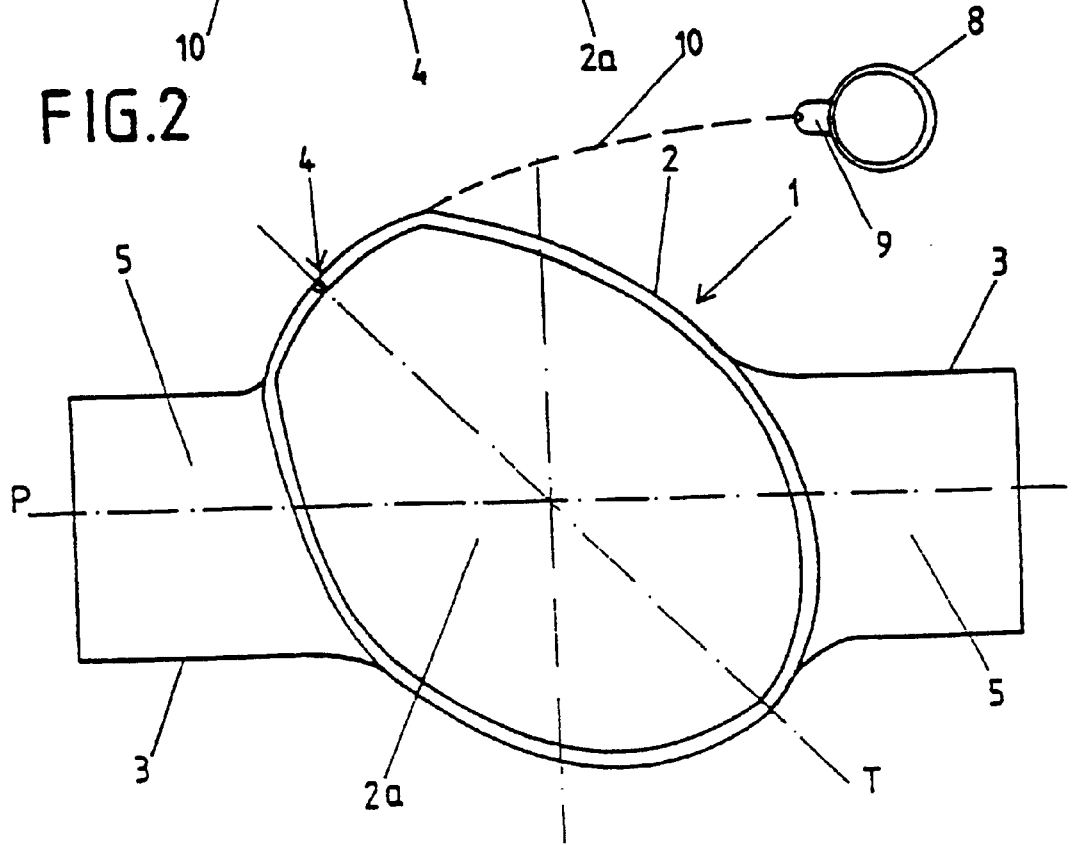

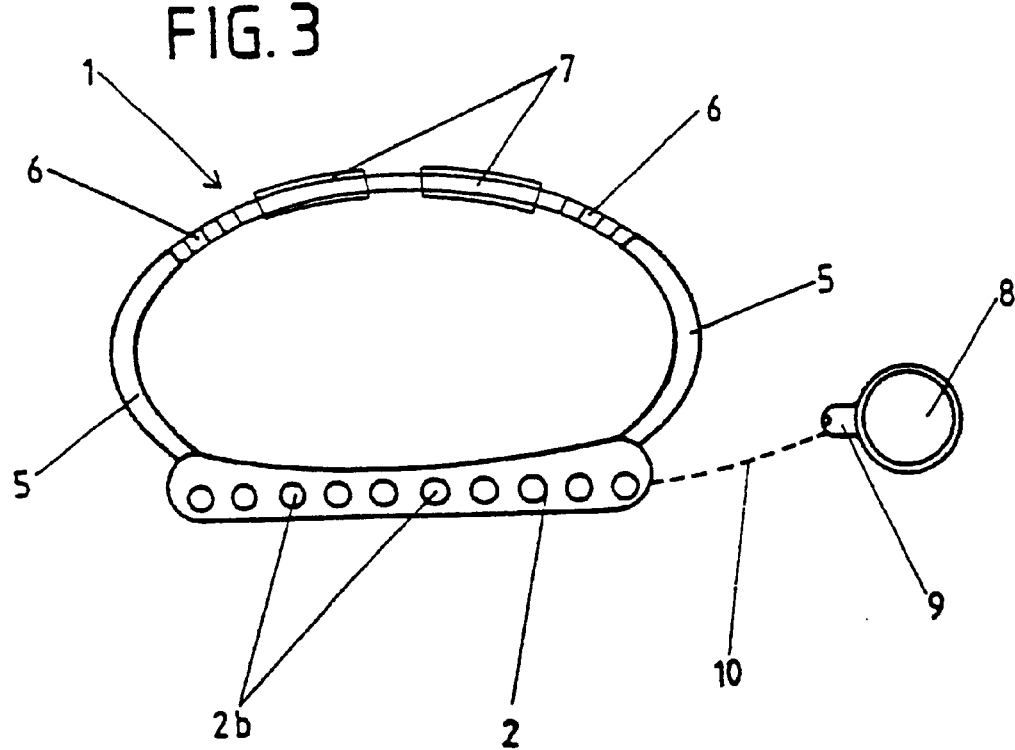
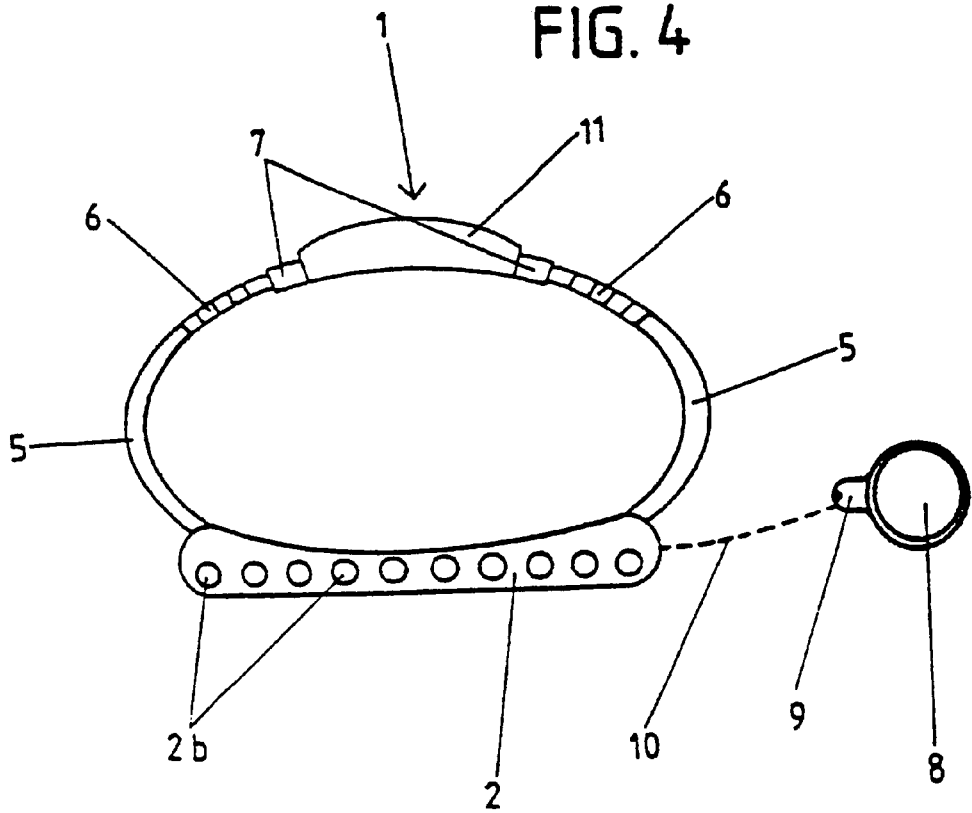

BRACELET TELEPHONE DEVICE

This application is a national stage application, according to Chapter II of the Patent Cooperation Treaty. This application claims th priority date of Jun. 11, 1997 for Spanish Patent Application No. U 9701634.

TECHNICAL FIELD AND BACKGROUND OF THE INVENTION

The present invention refers to a new telephone device, suitable to be coupled to the user's wrist, with the comfort which it involves, and endowed with multiple advantages related to the devices already known, up to the present date, all of them enabling to obtain an apparatus of the reduced size and weight which provide the desired objectives of comfortable transport and easy use.

One of the main cores of development of new products in the matter of movable telephony and wireless telephony terminals, is directed to a reduction of its weight and size, so as to provide, in this way, instruments which are more comfortable to use and to carry.

At the moment, the reduction of the size and the weight of those instruments is strictly based on the electronic and electrical aspects, such as on the one hand the miniaturization of electronic components and on the other hand the increment of the charge capacity of the feeding electrical batteries, which enable day after day a considerable reduction of the size of apparatus of movable telephony of wireless telephony terminals, without decreasing its power, fidelity and autonomy performances. Nevertheless, the reduction of the size and weight originated by these factors is very expensive since it needs a high basic research cost.

There is then a technical need to reach a reduction of the size and reduction of the weight of those instruments, so that they are more comfortable to use and to carry.

SUMMARY OF THE INVENTION

The present invention is based on the knowledge that an additional reduction of size and/or easier use and transport, may also be reached by means of an appropriated functional disposition of the different elements which form these instruments, i.e. of its operation keyboard, viewing display and feeding batteries, so that they can be a part of the bracelet portable device.

According to the invention, this object is reached by means of a telephone device with a movable telephone apparatus/wireless telephone terminal coupled to a bearing with the shape of bracelet for the wrist of the user characterized, according to its first claim, in that:

at least a portion of the bracelet bearing includes, or is itself, an/several electrical battery/ies to feed the said apparatus;

the movable telephone apparatus/wireless telephone terminal, is mounted upon the bracelet bearing, so that being coupled upon the user's wrist, its front panel with its operation keyboard, presentation display/ies and microphone are directed to the outside, so the said panel may be activated and may be observed and by means of the turning of the user's wrist its microphone will be placed in front of the mouth of the user; and removably associated to the housing of the movable telephone apparatus/wireless telephone terminal there is provided a ring shaped piece, which can be coupled to a user's finger, which carries the earphone of the said apparatus and which is connected to it, by means of an extensible wire of electrical connection, or by radio.

According to an additional feature, according to the second claim, the bracelet bearing has extensible portions and/or fitting and closing mecanisms for a fitted coupling and comfortable to the wrist of the user.

According to another feature of the invention, according to the third claim, the movable telephone apparatus/wireless telephone terminal has an oblong disposition and is arranged with its main symmetry axe in oblique form related to the longitudinal axe of the wrist bearing, preferibly with an inclination of 45°, so that the useful lenght of its front is as big as possible without exceeding the widhtwise of the user's wrist.

Moreover, according to the invention, the keyboard, with buttons or digital, is disposed on the periphery of the apparatus so as to allow the use of the whole of its front surface as a display.

Aditionally, the aditional apparatus, for example, watch, compass, alarm, micro-computer, remote control, G-P.S. receiver, digital recorder, pedometer or is similar are disposed upon the bearing bracelet on the opposite side to the said telephone apparatus.

Other features and advantages of the invention will appear clearer from the following description, carried out with the assistance of the appended drawings which show an example of performance non limiting, and in which:

BRIEF DESCRIPTION OF THE DRAWINGS

FIG. 1 shows schematically a perspective view of a device according to the invention as it would be disposed for its use upon the wrist of the user.

FIG. 2 illustrates a schematic and partial plant view of the device according to FIG. 1.

FIG. 3 shows an elevation view of the device according to the figure and on the same position as in this.

FIG. 4 illustrates a similar view of the previous one but with optional aditional apparatus.

DESCRIPTION OF THE PREFERRED EMBODIMENT AND BEST MODE

With reference to the figures, it can be seen that the telephone device 1 according to the invention consists of a movable telephone apparatus/wireless telephone terminal 2 which is fixely or movably mounted upon a bracelet bearing 3.

The apparatus 2 consists of a front 2a with an operation keyboard, presentation/visualization display and a microphone 4; although on a preferred performance, the keyboard, as it is pointed out with 2b, is placed on the periphery outline of apparatus 2. This apparatus 2, as it is specially clearly illustrated on FIG. 1, is mounted upon the bracelet bearing 3 in such a way that when the device is coupled to the wrist of a user, the keyboard, display and microphone 4 of its front 2a are accessible to the user with a simple turn of his wrist.

The bracelet bearing 3, has portions or sections 5 which include, or are themselves, electrical battery/ies to feed the telephone apparatus 2, omitting for description simplicity reasons and of representation, the connexion details of the said battery/ies with the apparatus 2. Moreover, the bracelet bearing 3 has extensible sections 6 and optionally fitting and closing mecanisms 7 to reach a fitted and comfortable coupling to the user's wrist.

Making now special reference to FIG. 2, it can be seen that there is provided a ring shaped piece 8, which is removably asociated to the housing of the telephone apparatus 2, for bearing the earphone 9 of the said telephone apparatus 2, so that the said ring may be fitted to one of the user's ring so as to position the said earphone faced to the ear of the user, as necessary. This earphone 9 may be connected to its telephone apparatus 2 by means of an extensible electrical wire 10, or by radio, and have the appropriated anatomic shape for its coupling to the auditive pavilion.

As it can be seen in a specially clear manner on FIGS. 1 and 2, the telephone apparatus 2 has an oblong form, for example, oval, and is mounted upon the bracelet bearing 3, so that its greatest dimension, in this case its greatest symmetry axe T is oblique to the longitudinal axe P of the bracelet bearing 3; according to the invention it is preferred that this inclination has 45°. With this simple measure, it is guaranteed that the usable lenght of the telephone apparatus is as big as possible without exceeding the widhtwise of the user's wrist.

Making now particular reference to FIG. 4, it can be seen that oppositely to the telephone apparatus 2, other apparatus 11, such as, for example, a watch, a compass, an alarm, a G.P.S. receiver, a digital recorder, a micro-computer, a remote control, a pedometer or similar, can be optionally mounted upon the bracelet bearing 3.

Optionally, keyboard 2b may be endowed with devices for differenced confirmation of the orders carried out by acoustic signal transmitters, including the artificial voice ones.

The telephone apparatus 2, as well as the options 11, may be endowed with joints, membranes and/or sealling filters to provide tightness properties to the assembly liquids.

Ring 8 may be rigid or flexible, and the associated earphone 9 components may be entirely incorporated therein or a part of them being contained on the inside of the said ring 8; being also possible that the said earphone 9 is joined to it permanently, what is specially preferred for a connexion by radio, or being formed in such a way that they can be coupled/removed with each other for the connexion case by means of the extensible wiring 10. In this case, the connexion electrical wiring between the earphone 9 and the apparatus 2, may be housed on a housing appropriatly provided on the said apparatus 2.

As the object of the invention has been sufficiently described it only lasts to point out that the embodiments resulting from changes of the form, use of mechanical elements and/or electrical equivalents, as well as the derivatives of a routine application of the previously revealed, must be considered included inside its scope, in such a way that the invention will only be limited by the scope of the following claims.

What is claimed is:

1. New bracelet telephone device, consisting of a movable telephone apparatus/wireless telephone terminal (2) coupled to a bearing with the shape of bracelet (3) for the wrist of the user and which can also hold other apparatus (11) such as a watch, compass, calculator, micro-computer, G-P.S. receiver, alarm, digital recorder, remote control, pedometer or similars, characterized in that:

at least a portion (5), and preferibly several, of the bearing or bracelet (3) include, or is/are it/themselves, an electrical battery/ies to feed the aforementioned apparatus (2, 11);

the movable telephone apparatus/wireless telephone terminal (2) is mounted fixely or movably upon the bearing or bracelet (3), so that its front panel (2a) with its operation keyboard, screen and microphone (4) is directed to the outside, so that when device (1) is coupled to the user's wrist, the said keyboard (2a) may be activated and by means of the turning of the user's wrist its microphone (4) can be operatively placed in front of the mouth of the user; and removably asociated to the housing of the movable telephone apparatus/wireless telephone terminal (2) there is provided a ring shaped piece (8), which can be coupled to a user's finger, which carries the earphone (9) of the said apparatus (2) and which is connected to it by means of an extensible connexion wire (10) or by radio, in such a way that the said earphone (9) may be operatively facing the user's ear and, eventually, being adapted to the auditive pavilion by its anatomic shape.

* * * * *